United States Patent [19]

Hernqvist et al.

[11] 3,999,858
[45] Dec. 28, 1976

[54] METHOD OF ALIGNING A LASER DEVICE

[75] Inventors: Karl Gerhard Hernqvist, Princeton; Arthur Herbert Firester, Skillman, both of N.J.

[73] Assignee: RCA Corporation, New York, N.Y.

[22] Filed: Mar. 24, 1975

[21] Appl. No.: 561,352

[52] U.S. Cl. .......................... 356/152; 331/94.5 D; 356/138; 356/153
[51] Int. Cl.² ....................................... G01B 11/26
[58] Field of Search .......... 356/101, 112, 152, 153, 356/138; 331/94.5 D

[56] References Cited

UNITED STATES PATENTS

| | | | |
|---|---|---|---|
| 3,495,914 | 2/1970 | Young | 356/110 |
| 3,564,452 | 2/1971 | Rempel | 356/152 |

OTHER PUBLICATIONS

Everett, Review of Scientific Instruments, vol. 37, No. 3, 3-1966, pp. 375, 356-110.

Primary Examiner—Maynard R. Wilbur
Assistant Examiner—S. C. Buczinski
Attorney, Agent, or Firm—Glenn H. Bruestle; George E. Haas

[57] ABSTRACT

A method of aligning the mirrors and bore tube axis of a laser without actually operating the laser comprising the directing of two light beams through the bore tube collinear with the bore tube axis; the two light beams being directed through the tube from opposite ends of the tube. The mirrors are positioned so that one or both of the light beams are reflected from the mirrors along paths also collinear with the bore axis. A fine alignment of the mirrors is provided by detecting the light of a modulated laser beam passed through the bore and mirrors. The mirrors are accurately positioned when the detected modulated laser beam provides a peak output.

4 Claims, 5 Drawing Figures

METHOD OF ALIGNING A LASER DEVICE

This invention is a method of aligning a laser device having a bore tube with a small diameter bore therethrough. An optical mirror is fixed at one end of the bore and another optical mirror is fixed at the other end of the bore to provide an optical cavity between the mirrors and through the bore tube. The method is that of accurately aligning the mirrors with each other and with the bore of the bore tube to initiate a good lasing action during the operation of the laser device.

BACKGROUND OF THE INVENTION

The alignment of a gas laser cavity having one or two external Brewster windows can be accomplished by using a laser beam directed through the cavity. The external mirrors are moved into alignment to create a lasing action in the laser cavity and then the mirrors are permanently fixed when the output of the laser being aligned is optimized. However, many laser devices use mirrors which are rigidly attached to the laser bore tube. It is difficult with this type of laser device to tune the cavity by aligning the mirrors without operating the laser cavity being aligned. This requires that the laser bore tube be evacuated and then filled with the laser gas and connected into a circuit to provide an operating laser device. A definite advantage providing an economy in fabrication results if the laser bore tube can be separately aligned with the mirrors without it forming a part of an operating laser.

A further complication of aligning the mirrors and laser bore of the optical cavity is that the mirrors normally are formed as reflective coatings applied to surfaces of small blocks of transparent material, such as glass. If the alignment of the laser device is done without actually operating the laser with a gaseous medium, it is then necessary to direct aligning light beams through the mirror blocks and substantially normal to the mirror coatings on the block surfaces. The mirror blocks are not accurately formed and the opposite surfaces are usually not parallel to the mirror coatings and thus are not normal to the bore axis of the optical cavity. In fact, it is recognized that the mirror blocks are effectively small wedges of transparent material which preclude a straight line passage of an aligning light beam through the block without refraction.

SUMMARY OF THE INVENTION

The alignment of the laser parts forming the optical cavity of the laser to provide a fine tuning of the cavity is accomplished in accordance with embodiments of the invention by passing a first light beam from one end of the bore tube through the bore colinear with the axis of the bore. A first mirror is then fixed at the other end of the bore tube in a position to reflect the first light beam back along the bore axis. A second light beam is passed from the other end of the bore tube through the bore collinear with the bore axis. A second mirror is then fixed at the one end of the bore tube to reflect either the first or the second light beam along a path which has a direct relationship with the beam path of the second light beam.

In one embodiment of the invention, the second mirror is adjusted in a position such that the first light beam reflected from the back side of the concave mirror is displaced in a plane of the bore axis twice the distance from the bore axis as the displacement in the same plane of the second light beam passing through the concave mirror.

In another embodiment of the invention, the second light beam is a modulated laser beam having a range of frequencies close to the resonant light frequency of the optical cavity extending between the mirrors. The intensity of the second light beam is detected after it has passed through the second mirror. The position of the concave mirror is fixed when the detected intensity of the second light beam is at a peak.

By this invention, laser alignment can be achieved without operating the laser. Also, the wedge effect of the mirror blocks is compensated for.

DETAILED DESCRIPTION OF THE INVENTION

Figure 1:
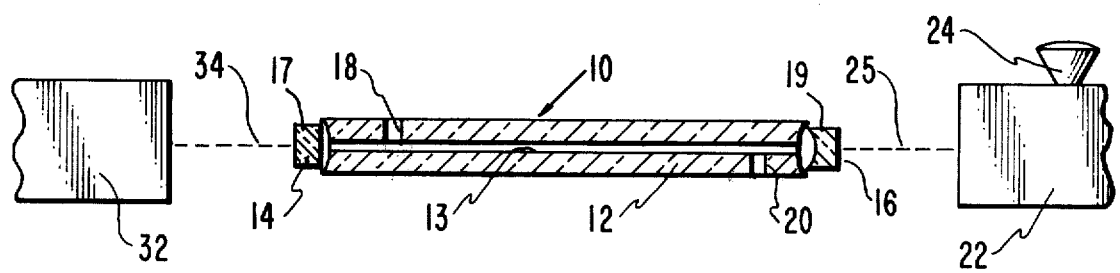
FIG. 1 is a schematic showing of a system of aligning of a laser device, in accordance with an embodiment of the invention.

FIG. 1 schematically shows one system for aligning a laser device 10 consisting of a bore tube 12 having a mirror 14, which may be flat, fixed at one end of the bore tube 10 and a second mirror 16 fixed at the other end of the bore tube. The second mirror may be curved and formed by a reflective coating on the surface of a piece of transparent material. In FIG. 1 the curve of mirror 16 is greatly exaggerated.

The laser parts 12, 14 and 16 provide an optical cavity for the laser device. It is understood that the device 10 is either completely or partially enclosed within an envelope (not shown). The envelope is filled with a sufficient amount of gas to provide a lasing action of the gas filling within the optical cavity, when a gaseous discharge is formed between an anode (not shown) and a cathode electrode (not shown) also mounted within the envelope. A passageway 18 is formed through the wall of the bore tube 12 to provide access to an anode electrode (not shown) mounted within the laser envelope. In a similar manner, a passage 20 is formed at the opposite end and through the wall of the laser bore tube to provide access of the optical cavity to a cathode electrode (not shown) also mounted within the envelope of the laser tube. U.S. Pat. No. 3,792,372 issued to John Thomas Mark discloses a laser having structure similar to the laser device 10.

The description of the invention is applied by way of example to a laser device 10 of a He—Ne laser having a spacing between mirrors 14 and 16 of about 27 cm. The diameter of the bore 13 of the bore tube is about 1.5 mm. Mirror 14 is flat and the concave mirror 16 has about a 30 cm. radius of curvature. Mirrors 14 and 16 are substantially cylindrical blocks of glass 17 and 19, having respective mirror coatings (not shown) on their inner circular surfaces facing the bore 13. The concave mirror 16 is the output mirror and exhibits a 1% light transmission at the frequency of the laser light through the mirror coating.

Figure 2:
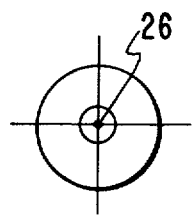

In the alignment of the laser device, a light source, such as an autocollimator 22, is used. The autocollimator is an optical device providing a narrow beam of light which can be directed along a path 25 through the bore 13 for aligning the bore with the mirrors 14 and 16. The autocollimator also has an eye piece 24 through which can be viewed light directed along path 25 into the autocollimator. If such light is directed along the same path as the emitted light, a bright spot will appear at the center of the reticle of the eye piece 24. For example, FIG. 2 schematically shows a typical reticle configuration consisting of perpendicular cross lines intersecting at the center of a series of concentric circles. A light beam entering the autocollimator 22 along path 25 will be observed as a light spot 26 at the center of the reticle configuration. Such autocollimators are well known and are available; for example, the AC-3 instrument sold by the American Optical Company.

Figure 3:
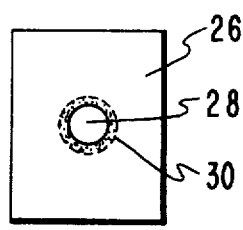
FIGS. 2, 3 and 4 are schematic showings of observations taken by the operator during the alignment of the laser device with the system of FIG. 1.

A light beam is first directed from the autocollimator 22 through the bore 13 of the bore tube without either of the mirrors 14 and 16 being present. The light beam is detected by a white card 26 (FIG. 3) positioned beyond the other end of the tube 12 and substantially normal to and intercepting the axis of bore 13. The light beam forms on the card a bright central spot 28 with a diffused fringe pattern 30 of light around the spot. FIG. 3 schematically shows this result. The diffused light pattern is formed by light reflected from the walls of the bore 13 as the autocollimator light passes through the bore. The bore tube 12 is adjusted until the pattern 30 of light is symmetrical around the light spot 28. At this point, the beam 25 of the autocollimator is aligned and is a collinear with the axis of the bore 13. The bore tube 12 is then fixed in this position relative to the autocollimator 22 and its beam path 25.

The flat mirror 14 without concave mirror 16 being present is now aligned with the bore 13 by placing it in position at one end of the bore tube 12, as shown in FIG. 1. The mirror 14 is adjusted, either manually or by any other appropriate means, until the light beam from autocollimator 22 striking the mirror 14 is reflected back along the beam path 25 and appears at the center of the reticle 24, as shown at 26 in FIG. 2. This results in the surface portion of the mirror 14, which reflects the beam, being normal to the axis of bore 13. Mirror 14 is now fixed in this aligned position.

In practice, the mirror 16 is a wave front correcting mirror, which is constructed so that light rays perpendicular to its mirror surface and passing through block 19 are refracted by the outer surface of block 19, so that they emerge from block 19 as a parallel ray bundle. Normally, there is an unknown wedge angle between the mirror surface facing the bore 13 and the non-parallel outer surface of the glass block facing the autocollimator 22, so that the emergent ray bundle is not generally parallel to a line through the center of block 19 and the center of curvature of mirror 16.

To optically align the concave mirror surface of block 19, another light source 32, such as a second autocollimator, or a laser, is positioned opposite the other end of the laser tube 12 beyond the flat mirror 14. Without the mirror block 19 being present, the light beam from this second light source is directed along a path 34 through the flat mirror 14, which is partially transmissive and through the bore 13 of the bore tube and along beam path 25 into the first autocollimator 22. The position of the second light source 32 is fixed when its light beam is centered at the reticle of the first autocollimator 22. It is quite possible that the flat mirror block 17 has a wedge angle between its flat mirror surface facing the bore 13 and the opposite surface of the block onto which the beam from source 32 is directed. However, with the light spot of the second beam at the center of the reticle 24 of the autocollimator 22, the light beam from the second light source 32 within the bore 13 is collinear also with the axis of the bore, which has been previously aligned collinear with the autocollimator 22.

Figure 4:
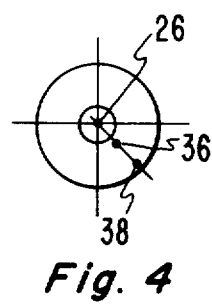

The concave mirror 16 is now put in place at the end of the bore tube 12, as indicated in FIG. 1. The second light beam from the light source 32 passing down the bore 13 into the autocollimator 22 is refracted as it passes through the mirror 16 due to the wedge angle between the surfaces of the block 19. As shown in FIG. 4, the spot of the second beam, as seen in the reticle of the first autocollimator 22, is moved by this refractive action from the center of the reticle to a new postion 36. Furthermore, the first light beam 25 from the autocollimator 22 is reflected from the backside of the reflective coating on the second mirror back into the autocollimator 22 and appears at a position 38, as shown in FIG. 4. The reflected first beam has a direct relationship with the second beam transmitted through mirror 16 as the first beam will be in a position twice the distance from the center 26, as is the spot 36 of the second beam. The mirror block 19 is now adjusted until the two light spots 36 and 38 are in line with the center 26 of the reticle, thus placing the reflected first beam and the transmitted second beam in a plane common with the plane of the axis bore 13. In this position of block 19, the concave mirror surface portion through which the axis of bore 13 passes is normal to the axis of bore 13.

The spot 38 is spaced twice the distance from the center 26 of the reticle as the light spot 36, since the first light beam from the autocollimator 22 passes through the mirror block 19 twice on its way back to the autocollimator 22, whereas the second beam from source 32 passes through the mirror block 16 only once. Thus, the refraction of the reflected first beam from the center of the reticle is twice that of the second beam. In the event that mirror 16 is not wave front correcting, for example concave-plano, autocollimator 32 should be varifocal to focus its beam on the reticle of autocollimator 22.

A second method, in accordance with another embodiment of the invention, for aligning the mirror 16, is to provide a second autocollimator as the light source 32. Without the mirror block 19 being present, the light beam from the second autocollimator 32 is centered in the reticle of the first autocollimator 22. This then aligns the second light beam within the bore collinear with the axis of the bore 13 which has been previously aligned collinear with the first light beam from the autocollimator 22, as described above. The position of the light source 32 compensates for any wedge angle between the opposed surfaces of the block 17. The mirror 16 is then placed in the position shown in FIG. 1 and the second light beam within the bore 13 is reflected by mirror 16 back down the bore through the mirror 14 and into the autocollimator 32. The mirror block 19 is adjusted until the reflected portion of the second light beam is centered on the cross-hairs of the second autocollimator 32. Thus, the second light beam portion reflected by mirror 16 is directly related to the second light beam portion incident on mirror 16 as the two beam portions are now collinear. Because the mirror of block 19 is concave, the reflected light will be largely spread out. Thus, it would be an advantage if the second autocollimator 32 is vari-focal so that the reflected portion of beam 34 can be focused into as small a spot as possible within the reticle of the autocollimator 32.

Figure 5:
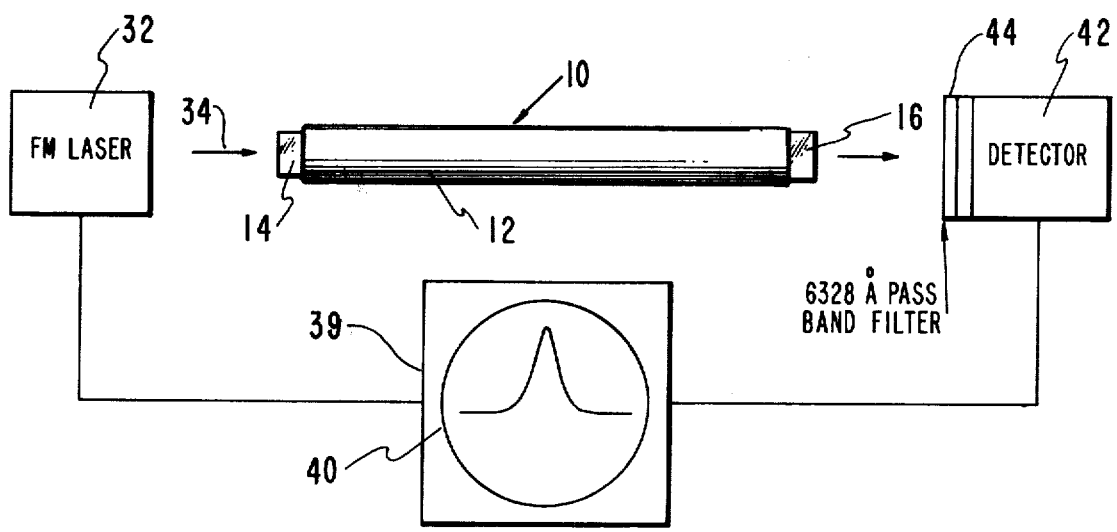
FIG. 5 is a schematic showing of an alignment system in accordance with a further embodiment of the invention.

To finely tune the optical cavity of the laser device 10 so that the alignment of the laser device will be accurate enough to achieve 75-100% of maximum laser power, the laser device can be aligned by the following method in accordance with another embodiment of the invention. This method is described with respect to FIG. 5 wherein similar structures are identified with the reference numbers used in FIG. 1. The second light source 32, in this method of alignment, is a He—Ne laser whose beam is frequency modulated over a range of frequencies including the resonant light frequency of the optical cavity between mirrors 14 and 16. The laser should be mode-matched to the laser device being aligned for optimum results. The laser 32 is aligned with the bore tube 12 in the manner described above, wherein the second light beam from source 32 is made collinear with the axis of the bore 13. The first autocollimator 22 of FIG. 1 is replaced with a detector 42 comprising, for example, a photomultiplier device placed behind and in alignment with the concave mirror 16 which may previously have been aligned by one or the other of the methods described above. The mirror 16 is not fixed in position at this time. The output signal of the photomultiplier detector is connected with the vertical displacement of an oscilloscope, whose faceplate 40 is schematically represented in FIG. 5.

The horizontal sweep of the oscilloscope is synchronized with the frequency swept by the FM laser 32. The modulation of the laser 32 is over a frequency range which includes the resonant frequency of th optical cavity of the laser device 10. As the laser frequency is swept through the cavity resonance of the device 10, the position of mirror 16 is adjusted and the typical Fabry-Perot transmission is observed. When the mirror 16 is accurately aligned with the bore axis, the optical cavity of device 10 will be in resonance with one of the frequencies through which the second beam of the laser 32 is swept. This resonance will be detected by a maximum amplitude indication on the face 40 of the oscilloscope.

This provides a fine tuning of the cavity of the non-operating laser device 10. At this point then, the mirrors 14 and 16 can be permanently fixed in their operative positions, either by being sealed directly to the ends of the bore tube 12, or by being fixed by other means in their position of alignment with the axis of the bore 13. As indicated in FIG. 5, a light filter 44 can be utilized with the detector 42 to filter out ambient light other than that of the modulated laser beam 34.

After the mirrors 14 and 16 are aligned and assembled with the bore axis of tube 12, the assembly is sealed to an envelope to provide an operative laser of the type disclosed in U.S. Pat. No. 3,792,372 referred to above.

The invention is not limited to a laser comprising a bore tube 12 closed at both ends with mirrors 14 and 16 respectively. Instead, bore tube 12 could be closed with one or more Brewster windows and the mirrors mounted externally of the tube 12, as shown for example in U.S. Pat. No. 2,760,296 issued Sept. 18, 1973 to Karl Gerhard Hernqvist. Nor should the invention be limited to He—Ne lasers as the gas or vapor content of the laser is determined by the type of laser fabricated and not by the method of aligning the components of the optical cavity.

We claim:
1. A method of aligning a laser device having a bore tube with a small diameter bore therethrough, and a mirror fixed at each end of said bore tube in alignment with the axis of said bore, by passing a first light beam from one end of said bore tube through the bore collinear with the axis of said bore, fixing one of said mirrors at the other end of said bore tube in a position to reflect said first light beam back along said bore axis, passing a second light beam from the other end of said bore tube through said one mirror and said bore coincident with said bore axis, and fixing the other mirror at said one end of said bore tube to reflect one of said light beams along a beam path having a predetermined relationship with a desired portion of the beam path of said second light beam.

2. A method of aligning a laser device in accordance with claim 1, wherein said other mirror is a reflective coating on the surface of a piece of transparent material, said method including fixing said other mirror in a position in which said first light beam is reflected from the back side of said mirror coating through said piece of transparent material and is displaced in a plane of the bore axis twice the distance from said bore axis as a displacement from said bore axis of said second light beam passing through said piece of material.

3. A method of aligning a laser device in accordance with claim 1, wherein said other mirror is fixed by directing a portion of said second light beam reflected from said other mirror collinear with a portion of said second light beam incident on said other mirror.

4. A method of aligning a laser device having a bore tube with a small diameter bore therethrough, and a flat mirror and a concave mirror, by passing a first light beam from one end of said bore tube through the bore coincident with the axis of said bore, fixing said flat mirror at the other end of said bore tube in a position to reflect said first light beam back along said bore axis, passing a second light beam from the other end of said bore tube through said bore and coincident with said bore axis, positioning said concave mirror at said one end of said bore tube, frequency modulating the light of said second light beam within a range of frequencies including the resonant light frequency of the optical cavity formed by said bore and extending between said flat and concave mirrors at the respective ends of said bore tube, detecting the intensity of said modulated light beam after it has passed through said optical cavity, and fixing the position of said concave mirror when the detected intensity of said second light beam is at a peak.

* * * * *